July 2, 1957  O. MANNING ET AL  2,797,941
VALVE HANDLE
Filed Jan. 4, 1954
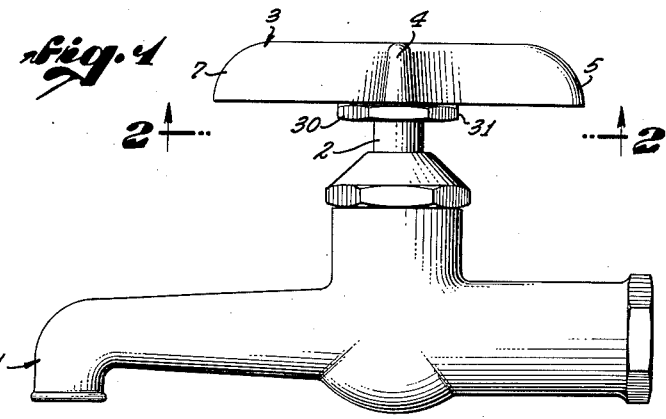
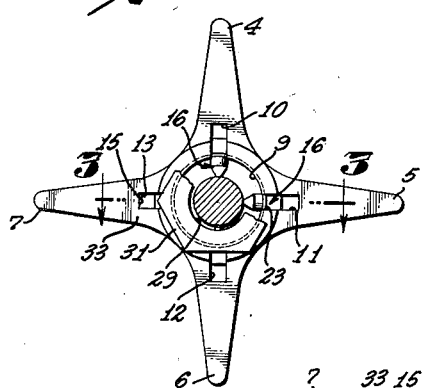
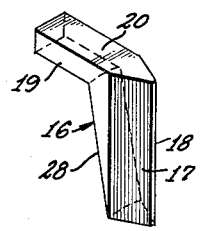
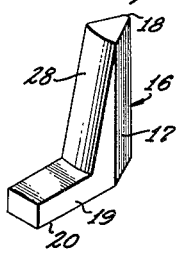
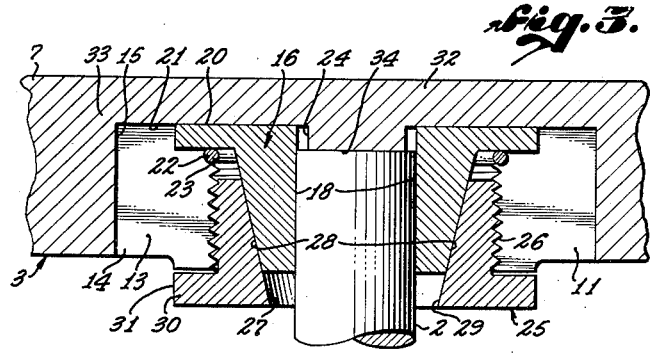
OSCAR MANNING &
SILAS MAGNESS,
INVENTORS.
BY W. E. Beatty
ATTORNEY.

2,797,941
VALVE HANDLE

Oscar Manning and Silas Magness, Los Angeles, Calif.

Application January 4, 1954, Serial No. 401,853

2 Claims. (Cl. 287—53)

The invention relates to a valve handle and more particularly to a valve handle suitable for replacing another valve handle which may have become broken or damaged.

With a replacement type of valve handle, the problem is to provide a handle which will fit securely on various types and sizes of valve stems. For example, the various stems may be round and either smooth, threaded or broached. Also the valve stem may be non-circular. All of these types of stems may be of different sizes.

While it has been proposed to provide a set screw or the like to fasten a handle on a valve stem, the prior known devices have not proven very satisfactory because the mode of attachment is not secure enough and in some cases not adapted to various types and sizes of valve stems.

An object of the present invention is to provide a valve handle which will securely and readily fit various types and sizes of valve stems. While the preferred use of the valve handle of this invention is as a replacement item, it may also be used as an original valve handle.

The present invention provides a variable or adjustable attaching device which will securely fit various types and sizes of valve stems, by providing cam operated jaws which engage the stem at several spaced points around the stem, with a cam sleeve carried by the handle to operate or lock the jaws. The working parts are preferably mounted in a cavity at the underside of the handle which protects the working parts, concealing them from view, and leading to a design which is attractive in appearance.

For further details of the invention, reference may be made to the drawings wherein:

Fig. 1 is a side view in elevation of a faucet having the valve handle of this invention.

Fig. 2 is a bottom plan view on line 2—2 of Fig. 1 looking in the direction of the arrows.

Fig. 3 is an enlarged sectional view on line 3—3 of Fig. 2, with parts broken away.

Figs. 4 and 5 are upright and inverted perspective views of one of the four jaws.

Referring in detail to the drawings, the faucet 1 has a valve stem 2 having the handle 3 of this invention. The handle 3 is here shown as in the form of a cross having four arms indicated at 4, 5, 6 and 7, these arms merging with a central portion 8 having a downwardly facing dead end threaded bore 9. Bore 9 is intersected lengthwise by four downwardly and inwardly facing slots 10, 11, 12 and 13, these slots having parallel side walls and being spaced 90° apart and each such slot being in line with one of the handle arms. For example as shown in Fig. 2, the slot 11 is in line with or coaxial with the arm 5 and the slot 13 is in line with or coaxial with the arm 7. Each of the slots 10 to 13 at its outer end terminates within the base of its respective arm as shown in Fig. 3 wherein the outer end 14 of slot 13 terminates at 15 within the base 33 of arm 7. The same applies to the other slots.

Slidably fitting in each of the slots 10 to 13 is an L-shaped jaw 16 shown in Figs. 4 and 5. Each jaw 16 has a uniform overall width which is slightly less than the width of its slot 10 to 13. Each jaw 16 has an upright jaw member 17 which tapers laterally to an elongated narrow jaw face 18 which is adapted to engage a portion of a valve stem regardless of whether it is smooth, threaded, broached, circular or non-circular. Each jaw 16 has a lateral foot or base 19 having a flat upper face 20 which slides on the end wall 21 at the inner end of the bore 9. Jaw face 18 is at right angles to the slide bearing face 20. Each slot like 13 extends into the body of the handle 3 for a greater distance than the depth of bore 9. The reason for this is that the inner end of bore 9 has a groove 22 for a removable split lock ring 23 which extends under each base 19 of all four of the jaws 16, to prevent these jaws from falling out when the handle is being positioned on a valve stem or when the handle is being assembled, packaged or displayed. Also each jaw 16 is prevented from falling out by reason of the fact that each slot 10 to 13 extends radially inward for a distance short of the axis of the handle, leaving a central abutment 24 which acts as a stop to limit the movement of the jaws radially inwardly, the distance from abutment 24 to the lock ring 23 being less than the length of each base like 19. The face 34 of abutment 24 rests on the end of the stem 2, to support the handle 3 on the stem, particularly while the sleeve 25 is being operated to fasten the handle 3 on the stem 2.

The jaws 16 are operated by a cam sleeve 25 having external threads 26 for the thread bore 9 and having an internal conical cam surface 27 which tapers inwardly in a downward direction with the same taper as the taper 28 of the outer surface of the upright leg of the jaw, so that each jaw 16 is forced inwardly to grip the valve stem 2, as the cam sleeve 25 is screwed into the bore 9. The sleeve 25 has a conical bore 29 which receives the stem 2, the sleeve 25 and stem 2 being coaxial when the handle 3 is fitted on the stem 2. The sleeve 25 has a flange 30 which has a non-circular periphery such as the hexagonal periphery shown at 31 to receive a wrench or other tool to thread or unthread the sleeve with respect to the bore 9.

The end wall 21 is the underportion of the top 32 of the handle 3 and as this top 32 is imperforate, this protects the working parts from dirt or liquid falling from above.

The stem engaging face of the jaw as shown at 18 in Fig. 4 is quite narrow so that each jaw will grip the valve stem 2 regardless of its size or configuration. As the slots 10 to 13 are deeper in a radial direction than the radial length of the jaw base 19, each jaw 16 can slide in and out in a radial direction to fit stems of different sizes. In the example shown in Fig. 3, the stem 2 is a comparatively small one whereas if a larger stem were used, the cam sleeve 25 would lock the jaws 16 to the stem at a position where the sleeve 25 is farther out from the threaded bore 9.

The handle 3 is a unitary molding or coating of metal such as brass or other material. The jaws 16 are all alike and each jaw may be a molding of brass or other material. The sleeve 25 is preferably of brass or other metal. The cast parts have a slight taper to facilitate the draft of the die.

In assembling the device, it is convenient to turn the handle 3 upside down and drop or insert the jaws 16 in their respective slots 10 to 13, whereupon the lock ring 23 is mounted in position in its groove 22. Then the sleeve 25 is threaded into the bore 9 and the valve handle is then ready for packaging, distribution, or use. As the lock ring 23 is removable, it could be removed after removing the sleeve 25 to replace or remove one or more of the jaws 16 if desired.

A particular advantage of the present invention is that the handle grips the stem independently of the direction in which the handle is rotated. If the handle were secured to the stem by screw threads, rotation of the handle in one direction would uncouple the threads and loosen the handle. On the other hand, the handle of the present invention grips the stem securely and with equal gripping force regardless of the direction in which the handle is rotated.

Various modifications may be made in the invention without departing from the spirit of the following claims.

We claim:

1. A valve handle comprising a handle member having a threaded bore dead end at its inner end in an upper portion of said handle member and open at the lower portion of said handle member, said handle member having a plurality of slots longitudinally intersecting and extending through the outer end of the threaded bore, each of said slots extending axially inwardly and radially outwardly of the inner end of said threads and forming a chamber and a jaw insertable into the outer end of said threaded bore and slidably fitting longitudinally and radially in each of said slots, each of said jaws having a lateral base slidably fitting the inner end of said chamber of each of said slots, a lock ring having a supporting groove at the inner end of said thread and supporting said bases in position and a hollow cam sleeve having an external thread threadably engaging said handle member thread, said sleeve having an internal conical bore, each of said jaws having an upright jaw member having an outer cam face, fitting said conical bore, and an inner valve stem engaging face.

2. A valve handle comprising a handle body having a downwardly facing cavity having an inner end wall and having a threaded bore terminating in advance of said wall, said threaded bore having a plurality of longitudinally and radially extending slots traversing the threads of said bore, the outer end of said threaded bore being open, a corresponding plurality of L-shaped jaws each insertable into one of said slots through the outer end thereof, each of said jaws having a lateral base having an inner face slidably fitting said wall and a lock ring in a groove at the inner end of said threaded bore and slidably supporting said bases, said handle body having a central abutment extending outwardly of said wall between the jaws and limiting inward movement of said jaws, the radial distance from each of said slots to said abutment being less than the corresponding length of each of said bases, each of said jaws having an upright stem engaging face and having an externally tapered surface, and a threaded sleeve fitting said bore and having a corresponding internally tapered surface.

References Cited in the file of this patent

UNITED STATES PATENTS

| | | |
|---|---|---|
| 752,462 | Morey | Feb. 16, 1904 |
| 1,453,548 | Duncombe | May 1, 1923 |
| 1,989,093 | Dahnken | Jan. 29, 1935 |
| 2,463,066 | Stuvel | Mar. 1, 1949 |

FOREIGN PATENTS

| | | |
|---|---|---|
| 465,575 | Great Britain | May 10, 1937 |
| 497,366 | Great Britain | Dec. 19, 1938 |